(12) United States Patent
Chelian et al.

(10) Patent No.: US 9,111,182 B1
(45) Date of Patent: Aug. 18, 2015

(54) SYSTEM, METHOD, AND COMPUTER PROGRAM PRODUCT FOR MULTISPECTRAL IMAGE PROCESSING WITH SPIKING DYNAMICS

(71) Applicant: HRL Laboratories, LLC, Malibu, CA (US)

(72) Inventors: Suhas E. Chelian, Encino, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 159 days.

(21) Appl. No.: 14/019,797

(22) Filed: Sep. 6, 2013

Related U.S. Application Data (60) Provisional application No. 61/697,771, filed on Sep. 6, 2012.

(51) Int. Cl.
*G06K 9/62* (2006.01)
*G06K 9/66* (2006.01)

(52) U.S. Cl.
CPC ........................................ *G06K 9/66* (2013.01)

(58) Field of Classification Search
USPC ......................................................... 382/156
See application file for complete search history.

(56) References Cited

U.S. PATENT DOCUMENTS

| | | | |
|---|---|---|---|
| 5,033,103 A | 7/1991 | Sillart | |
| 2007/0233623 A1* | 10/2007 | Vatchkov et al. | 706/19 |
| 2011/0091102 A1* | 4/2011 | Cimbalista, Jr. | 382/167 |
| 2014/0064609 A1* | 3/2014 | Petre et al. | 382/159 |

OTHER PUBLICATIONS

Famulare et al., Feature selection in simple neurons: how coding depends on spiking dynamics, Nov. 2011, pp. 1-23.*
D. Dacey and M. Petersen. Dendritic field size and morphology of midget and parasol ganglion cells of the human retina. Proceedings of the Notional Academy of Sciences, 89:9666-9670, 1992.
J. Demb and D. Brainard. Neurons show their true colors. Nature, 467:670-671, 2010.
J. Demb, K. Zighloul, L. Haarsma, and P. Sterling. Bipolar cells contribute to nonlinear spatial summation in the brisk-transient (Y) ganglion cell in mammalian retina. Journal of Neuroscience, 21:7447-7454, 2001.
C. Enroth-Cugell, J. Robson. D. Schweitzer-Tong, and A. Watson. Spatio-temporal interactions in cat retinal ganglion cells showing linear spatial summation. Journal of Physiology, 341:279-307, 1983.
T. Gollisch and M. Meister. Eye smarter than scientists believed: Neural computations in circuits of the retina. Neuron, 65:150-164, 2010.

(Continued)

*Primary Examiner* — John Strege
(74) *Attorney, Agent, or Firm* — Tope-McKay & Associates (57) ABSTRACT

Described is a system for multispectral image processing with spiking dynamics. For example, the system receives an input image and compresses the image through space and spectrally variant sampling. Center-surround dynamics are modeled to control high dynamic ranges of the image and provide gain control. Further, habituative dynamics are modeled to produce outputs specialized for static or dynamic image content. Finally, neural spikes are generated based on the habituative dynamics. The neural spikes are saved or provided to other systems for further image processing.

21 Claims, 6 Drawing Sheets

(56) References Cited

OTHER PUBLICATIONS

S. Grossberg. Some physiological and biochemical consequences of psychological postulates. Proceedings of the National Academy of Scienoes, 60:758-765, 1988.

S. Grossberg, Contour enhancement, short-term memory, and constancies in reverberating neural networks, Studies in Applied Mathematics, 52:213-257, 1973.

S. Grossberg, Cortical dynamics of three-dimensional form, color, and brightness perception, II: Binocuiar theory, Perception and Psychophysics, 41:117-158, 1967.

S. Grossberg and S. Hong. A neural model of surface perception: Lightness, anchoring, and filling-in, Spatial Vision, 19:263-321, 2006.

J. Keat, P. Reinagel, R. Reid, and M. Meister. Predicting every spike: a model for the response of visual neurons. Neuron, 30:803-817, 2001.

P. Lichtsteiner, C. Posch, and T. Delbruck. A 128×128 120 db 15us latency asynchronous temporal contrast vision sensor. IEEE Journal of Solid-State Circuits, 43.566-576, 2008.

K. Minkovich, C. M. Thibeault, M. J. O'Brien, A. Nogin, Y. K. Cho, N. Srinivasa, "HRI.Sim: A High Performance Spiking Neural Network Simutator for GPGPU Clusters," IEEE Transactions on Neural Networks and Learning Systems, DOI 10.1109/TNNLS.2013.2276056, 2013.

Compute Unified Device Architecture (CUDA) Programming Guide. NVIDIA, http://developer.nvidia.com/object/cuda.html, 2007.

A. Pope and P. Langley. CASTLE: A framework for integrating cognitive models into virtual environments. In Proceedings of the Twenty-Third National Conference on Artifical Intelligence (AAAI-08), Chicago, IL, 2008. AAAI Press.

A. Roorda, A. Metha, P. Lennie, and D. Williams, Packing arrangement of the three cone classes in primate retina. Vision Research, 41:1291-1306, 2001.

M. Tessier-Lavigne. Principies of Neural Science, chapter Visual Processing by the Retina, pp. 507-522. McGraw-Hill, 4th edition, 2000.

R. De Valois, N. Cottaris, S. Elfar, L. Mahon, and J. Wilson. Some transformations of color information from lateral geniculate nucleus to striate cortex. Proceedings of the National Academy of Sciences, 97:4997-5002, 2000.

A. Wohrer and P. Kornprobst. Virtual retina: a biological retina model and simulator, with contrast gain control, Journal of Computational Neuroscience, 26:219-249, 2009.

M. Yeasin and R. Sharma. Machine Learning and Robot Perception, chapter Foveated vision sensor and image prooessing—a review, pp. 57-98. Springer-Verlag, Berlin, 2005.

K. Zaghloul and K. Boahen. A silicon retina that reproduces signals in the optic nerve. Journal of Neural Engineering, 3:257-267, 2006.

R. Sarpeshkar, Analog versus digital: extrapolating from electronics to neurobiology. Neural Computation, 10:1601-1638, 1998.

* cited by examiner

| | Biology | Model | Demonstration |
|---|---|---|---|
| (a) | Input (e.g., from a virtual environment) | (f) — | (k) [image: 408, 406] |
| (b) | Receptors & horizontal cells<br>• Space variant sampling | (g) $\phi(r) = \dfrac{\Phi}{1 + \dfrac{[r-R]^+}{R}(2r-1-R)}$ (1) | (l) [image: 400] Density & Scale vs Retinal eccentricity |
| (c) | Bipolar cells<br>• Gain control | (h) $\varepsilon_x \dfrac{dx}{dt} = -Ax + (B-x)I^p - (x+C)I^s$ (2) | (m) Neuron activation vs Log 10 of surround input |
| (d) | Amacrine & ganglion cells<br>• Habituative dynamics | (i) $\varepsilon_y \dfrac{dy^j}{dt} = D(1-y^j) - E^j y^j [x^j(t-F) - G]^+$ (3)<br>$\varepsilon_z \dfrac{dz^j}{dt} = -Hz^j + y^j x^j$ (4)<br>$o^{p,j} = pz^j$ (5) | (n) [image: 402, 404] Neuron activation vs Time |
| (e) | Output (to LGN, SC, etc.) | (j) — | (o) Parvo. Magno. |

| Image Size | System of the Present Invention | Virtual Retina |
|---|---|---|
| 64x64 | | |
| Total Time | 1 m 20.26 s (1.20 s) for 16384 neurons | 2 m 3.50 s (13.30 s) for 7680 neurons |
| Time Per Neuron | 4.90 ms | 16.08 ms |
| 128x128 | | |
| Total Time | 5 m 2.97 s (1 m 0.49 s) for 65536 neurons | 5 m 20.14 s (51.7 s) for 13060 neurons |
| Time Per Neuron | 4.62 ms | 24.51 ms |

FIG. 6

SYSTEM, METHOD, AND COMPUTER PROGRAM PRODUCT FOR MULTISPECTRAL IMAGE PROCESSING WITH SPIKING DYNAMICS

CROSS-REFERENCE TO RELATED APPLICATIONS

The present application is a Non-Provisional Patent Application of U.S. Provisional Application No. 61/697,771, filed on Sep. 6, 2012, entitled, "Method and apparatus for multispectral image processing with spiking dynamics."

STATEMENT REGARDING FEDERALLY SPONSORED RESEARCH OR DEVELOPMENT

This invention was made with government support under DARPA's SyNAPSE Contract HR0011-09-C-0001. The government has certain rights in the invention.

BACKGROUND OF THE INVENTION (1) Field of Invention

The present invention relates to an image processing system, and more particularly, to a system for multispectral (e.g., color) image processing with spiking dynamics based on a biological retinal model.

(2) Description of Related Art

In nature, image processing is typically performed by a retina. The retina has evolved to provide a variety of very effective image processing features. From a technology perspective, retinas exhibit several features such as mixed analog-digital signaling, spatially variant sampling, and gain control, which have yet to be matched in commercially available image sensors. From a biology perspective, retinas contain tremendous anatomical complexity—at least 50 different cell types arranged in no less than 12 fine layers (see, for example, the List of Incorporated Literature References, Literature Reference No. 5).

In an attempt to imitate nature, several retinal models have tried to bridge the gap between technology and biology, both in hardware (see. Literature Reference Nos. 20 and 11) and software (see Literature Reference Nos. 18 and 9). For example, the work of Grossberg and Hong (i.e., Literature Reference No. 9) does not consider spiking dynamics and hence is unlikely to scale to biological levels in terms of density and power efficiency (see Literature Reference No. 21). All other retinal models (see Literature Reference Nos. 20, 11, and 18) do not consider multispectral images. The work of Lichtsteiner et al. (i.e., Literature Reference No. 11) does not distinguish between sustained and transient dynamics potentially limiting its ability to transmit static image content.

The prior art suffers from a variety of problems, as noted above. Thus, a continuing need exists for a system that incorporates a new retina model with extended scaling capabilities that still maintains a high degree of biological fidelity in structure and function. Such a system would desirably demonstrate multispectral processing and provide a bridge between technological and biological features of retinas.

SUMMARY OF INVENTION

The present invention relates to a system for multispectral image processing with spiking dynamics. The system includes one or more processors and a memory that include instructions for causing the one or more processors to perform a variety of operations. For example, the system receives an input image (having image coordinates (row, column)) and translates the image coordinates into neuron coordinates. The system then compresses the image, using the neuron coordinates, through spatial and spectrally variant sampling. Center-surround dynamics are modeled, based on the neuron coordinates, to control high dynamic ranges of the image and provide gain control. Further, habituative dynamics are modeled, based on the neuron coordinates, to produce outputs specialized for static or dynamic image content. Finally, neural spikes are generated based on the habituative dynamics. The neural spikes are saved or provided to other systems for further image processing.

In another aspect, image coordinates (row, column) in the input image are translated to neural coordinates $(r, \theta)$ using a look up table.

Further, spatially variant sampling is provided using a scaling function, as follows:

$$\phi(r) = \frac{\Phi}{1 + \frac{[r-R]^+}{R}(2r-1-R)},$$

where $\phi(r)$ is the scaling function, where $\phi$ refers to a base value of the scaling function at a fovea, r refers to eccentricity, R refers to a size of the fovea, and $[\ ]^+$ is a Heaviside function.

In another aspect, spectrally variant sampling is provided by randomly assigning receptors different spectra according to a given proportion of receptors across spectra.

Additionally, center-surround dynamics to control high dynamic ranges of the image and provide gain control are given as follows:

$$\varepsilon_x \frac{dx}{dt} = -Ax + (B-x)I^e - (x+C)I^i,$$

where $\epsilon_x$ is an integration constant, where x is the membrane voltage of a bipolar cell, $I^e$ represents excitatory inputs, $I^i$ represents inhibitory inputs, and A, B, and C are parameters. $I^e$ and $I^i$ are derived by convolving the input image with Gaussian kernels of different sizes. Presently, look up tables are used to quickly translate between image coordinates (row, column) and neuron coordinates $(r, \theta)$. For simplicity, retinal location $(r, \theta)$ and scale $(s^{(r)})$ indices are not shown in the equation above.

In yet another aspect, habituative dynamics to produce outputs specialized for static or dynamic image content are given as follows:

$$\varepsilon_y \frac{dy^t}{dt} = D(1-y^t) - E^t y^t [x^t(t-F) - G]^+,$$

and $$\varepsilon_z \frac{dz^t}{dt} = -Hz^t + y^t x^t,$$

where $\epsilon_y$ and $\epsilon_z$ are integration constants, $y^t$ refers to neurotransmitter resources between a bipolar and ganglion cell layer, superscript t refers to a type of ganglion cell, $x^t$ refers to activity of bipolar cells, and $z^t$ refers to continuous activity of the ganglion cell, and D, $E^t$, F, G, and H are parameters.

Additionally, neural spikes are generated using the following equation as a modulation factor on interspike intervals:

$$a^{p,t} = pz^t,$$

where P denotes polarity, t denotes type, $a^{p,t}$ denotes continuous ganglion cell response including polarity and type, and $z^t$ refers to the continuous activity of the ganglion cell.

Finally, the present invention also includes a computer program product and a computer implemented method for performing the operations listed herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to an image processing system, and more particularly, to a system for multispectral (e.g., color) image processing with spiking dynamics based on a biological retinal model. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited and incorporated references is provided. Next, a description of various principal aspects of the present invention is provided. Subsequently, an introduction provides the reader with a general understanding of the present invention. Next, details of the present invention are provided to give an understanding of the specific aspects. Finally, a description of implementation, benchmarking, and experimental results is provided.

(1) List of Incorporated Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. D. Dacey and M. Petersen. Dendritic field size and morphology of midget and parasol ganglion cells of the human retina. *Proceedings of the National Academy of Sciences,* 89:9666-9670, 1992.

2. J. Demb and D. Brainard. Neurons show their true colors. *Nature,* 467:670-671, 2010.

3. J. Demb, K. Zaghloul, L. Haarsma, and P. Sterling. Bipolar cells contribute to nonlinear spatial summation in the brisk-transient (Y) ganglion cell in mammalian retina. *Journal of Neuroscience,* 21:7447-7454, 2001.

4. C. Enroth-Cugell, J. Robson, D. Schweitzer-Tong, and A. Watson, Spatio-temporal interactions in cat retinal ganglion cells showing linear spatial summation. *Journal of Physiology,* 341:279-307, 1983.

5. T. Gollisch and M. Meister. Eye smarter than scientists believed: Neural computations in circuits of the retina. *Neuron,* 65:150-164, 2010.

6. S. Grossberg. Some physiological and biochemical consequences of psychological postulates. *Proceedings of the National Academy of Sciences,* 60:758-765, 1968.

7. S. Grossberg. Contour enhancement, short-term memory, and constancies in reverberating neural networks. *Studies in Applied Mathematics,* 52:213-257, 1973.

8. S. Grossberg. Cortical dynamics of three-dimensional form, color, and brightness perception, II: Binocular theory. *Perception and Psychophysics,* 41:117-158, 1987.

9. S. Grossberg and S. Hong. A neural model of surface perception: Lightness, anchoring, and filling-in. *Spatial Vision,* 19:263-321, 2006.

10. J. Keat, P. Reinagel, R. Reid, and M. Meister. Predicting every spike: a model for the response of visual neurons. *Neuron,* 30:803-817, 2001, 11. P. Lichtsteiner, C. Posch, and T. Delbruck. A 128×128 120 db 15 us latency asynchronous temporal contrast vision sensor. *IEEE Journal of Solid-State Circuits,* 43:566-576, 2008.

12. K. Minkovich, C. M. Thibeault, M. J. O'Brien, A. Nogin, Y. K. Cho, N. Srinivasa, "HRLSim: A High Performance Spiking Neural Network Simulator for GPGPU Clusters," IEEE Transactions on Neural Networks and Learning Systems, DOI 10.1109/TNNLS.2013.2276056, 2013.

13. Compute Unified Device Architecture (CUDA) Programming Guide. NVIDIA, http://developer.nvidia.com/object/cuda.html, 2007.

14. A. Pope and P. Langley. CASTLE: A framework for integrating cognitive models into virtual environments. In *Proceedings of the Twenty-Third National Conference on Artificial Intelligence (AAAI-08)*, Chicago, Ill., 2008. AAAI Press.

15. A. Roorda, A. Metha, P. Lennie, and D. Williams. Packing arrangement of the three cone classes in primate retina. *Vision Research*, 41:1291-1306, 2001.

16. M. Tessier-Lavigne. *Principles of Neural Science*, chapter Visual Processing by the Retina, pages 507-522. McGraw-Hill, 4th edition, 2000.

17. R. De Valois, N. Cottaris, S. Elfar, L. Mahon, and J. Wilson. Some transformations of color information from lateral geniculate nucleus to striate cortex. *Proceedings of the National Academy of Sciences*, 97:4997-5002, 2000.

18. A. Wohrer and P. Kornprobst. Virtual retina: a biological retina model and simulator, with contrast gain control. *Journal of Computational Neuroscience*, 26:219-249, 2009.

19. M. Yeasin and R. Sharma. *Machine Learning and Robot Perception*, chapter Foveated vision sensor and image processing—a review, pages 57-98. Springer-Verlag, Berlin, 2005.

20. K. Zaghloul and K. Boahen. A silicon retina that reproduces signals in the optic nerve. *Journal of Neural Engineering*, 3:257-267, 2006.

21. R. Sarpeshkar. Analog versus digital: extrapolating from electronics to neurobiology. *Neural Computation*, 10:1601-1638, 1998.

(2) Principal Aspects

The present invention has three "principal" aspects. The first is an image processing system. The system is typically in the form of a computer system having one or more processors that operate software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
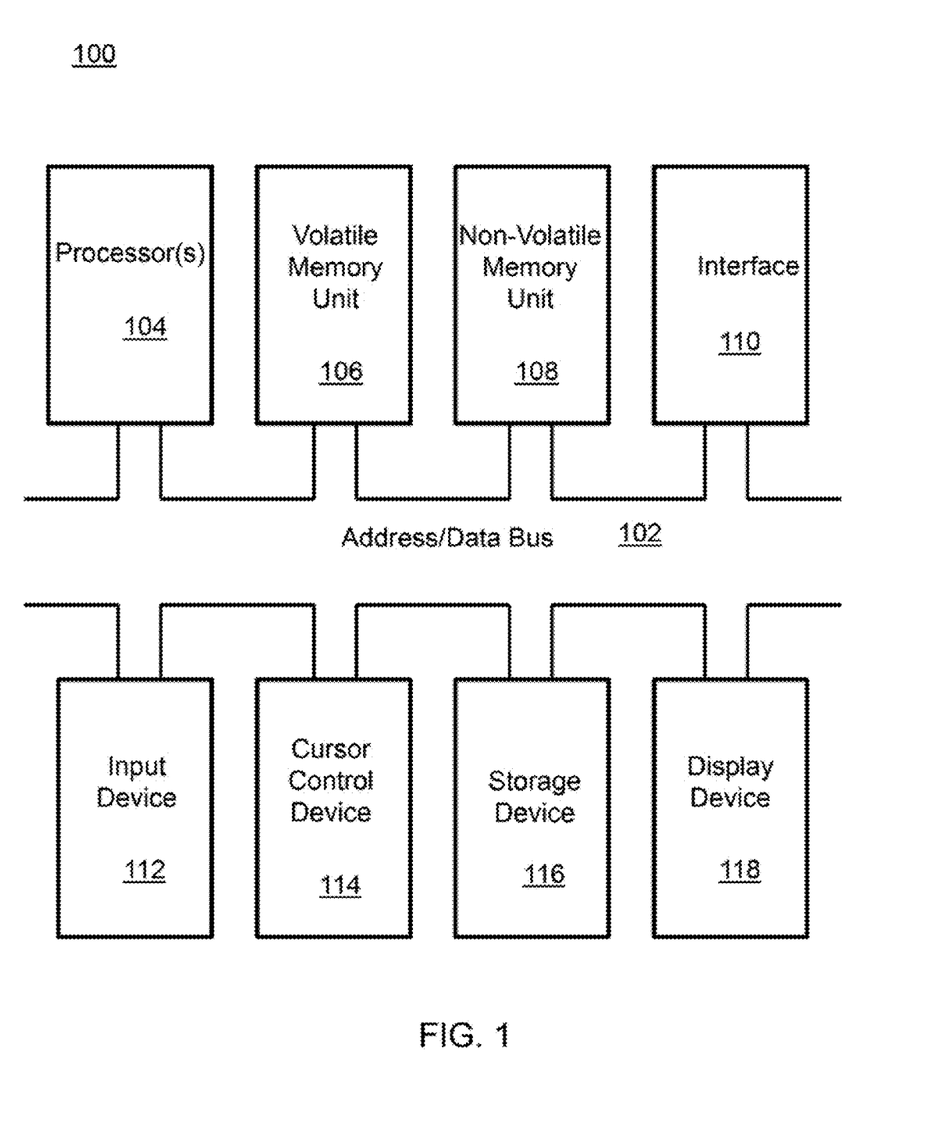
FIG. 1 is a block diagram depicting the components of an image processing system according to the principles of the present invention.

A block diagram depicting an example of an imaging processing system (i.e., computer system 100 with the relevant hardware) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within non-transitory computer readable memory units and are executed by one or more processors of the computer system 100. When executed, the instructions cause the computer system 100 (and its one or more processors) to perform specific actions/operations and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc. coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive "HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
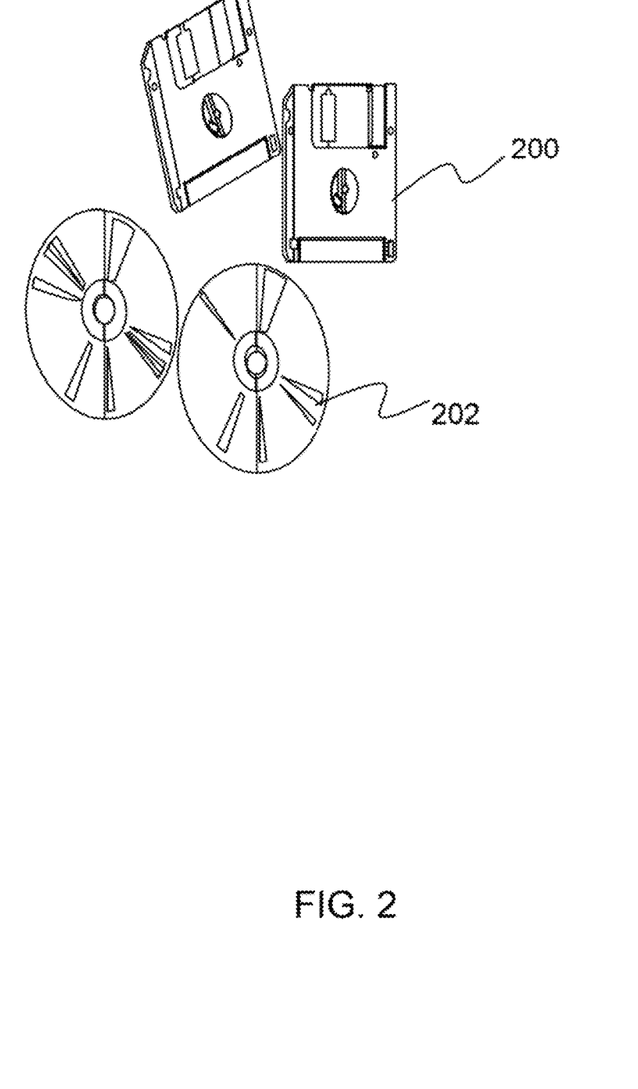
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

(3) Introduction

The present invention is directed to a system for multispectral (e.g., color) image processing with spiking dynamics that is based on a study of the structure and function of biological retinas. The system matches several key functionalities, including cone opponency, in a bio-plausible way. With respect to other models, the present invention also shows improved scaling capabilities.

The system can be used to compressively transduce multispectral high dynamic range images within any algorithm or as part of a larger systems-level application. The system also provides a bridge between technological and biological features of retinas and can be implemented in a hardware or all software solution. The system has applications for image processing in robotics, autonomous vehicles, and any other system that can benefit from multispectral image processing.

(4) Specific Details of the Invention

From a technology perspective, retinas exhibit several features such as mixed analog-digital signaling, spatially variant sampling, and gain control. Within the retina, cells are arranged in three gross layers, as follows: (1) outer plexiform (light receptors and horizontal cells), (2) bipolar cells, and (3) inner plexiform (amacrine and ganglion cells). The three layers are referenced in the biology column of FIG. 4, as boxes b, c, and d, respectively. At the light receptor and horizontal cell layer (see FIG. 4, box b), rods and cones integrate photons into ON-center, OFF-surround and OFF-center, ON-surround receptive fields (i.e., center surround dynamics). Cones have higher spectral selectively than rods, which provides the basis of color vision. Horizontal cell receptive fields (often modeled with a difference of Gaussians kernel (see Literature Reference No. 4)) create a spatio-temporal band-pass filter, which suppresses noise and shallow illumination gradients. Furthermore, in primates, light receptors are packed much more densely in the fovea, providing spatially variant sampling. Typically, this is modeled where the density and spatial scale of neurons falls off as a function of eccentricity (see Literature Reference No. 1). This resource-economic representation is also popular in robotics and video compression (see Literature Reference No. 19). At the bipolar cell layer (see FIG. 4, box c), gain control helps handle the several decade intensity range between brightest day and darkest night. Finally, habituative dynamics at the amacrine and ganglion cell layer (see FIG. 4, box b) give rise to sustained and transient response profiles which are best suited for static (e.g., colors) and dynamic (e.g., motion) processing respectively. Anatomically speaking in primates, these cell types are referred to as parvocellular (cat X) and magnocellular (cat Y) cells, respectively.

The present invention provides a new retinal model that provide functions similar to that of a biological retina and its three cell layers (as described above). Specifically and as depicted in the information flow diagram of FIG. 3, the system first receives an input image 300. The input image 300 is received directly from an environment (e.g., from sensors such as a camera, etc.) or from other systems or hardware (e.g., from a virtual environment). An outer plexiform module 302 performs space and spectrally variant sampling to compress images. Thereafter, a bipolar cell module 304 provides gain control to handle high dynamic ranges. Finally, an inner plexiform module 306 performs habituative dynamics to produce outputs 308 specialized for static or dynamic image content. As a non-limiting example, the output is separate spike trains whose firing rate is high for large intensities (static image content) or quick changes (dynamic image content). The former can be used to recognize shapes or objects while the latter can be used to detect flicker or motion.

Further detail is provided below with respect to each functional component. For each component, its model is illustrated (see FIG. 4, boxes g-i) along with demonstrations (see FIG. 4, boxes l-o, and FIG. 5).

(4.1) Outer Plexiform Module

Figure 3:
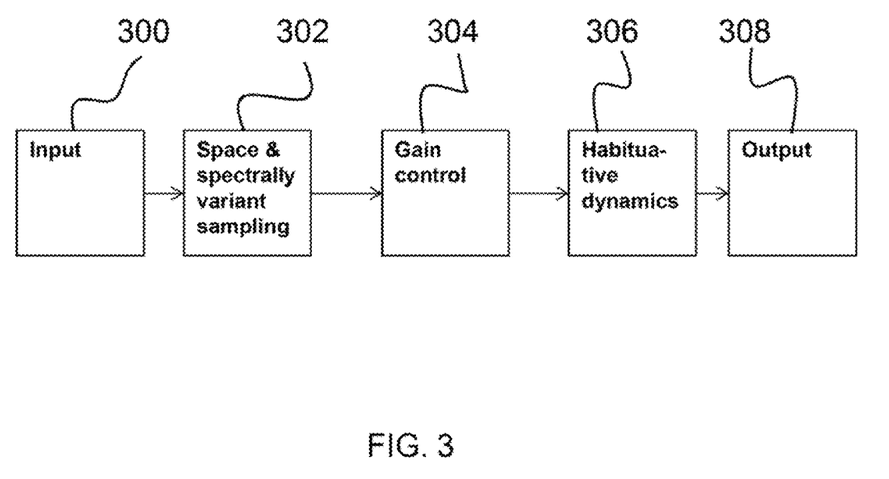
FIG. 3 is an information flow diagram according to the principles of the present invention.

As noted above, the outer plexiform module 302 receives an input image and performs space and spectrally variant sampling to compress images. Presently, look up tables are used to quickly translate between image coordinates (row, column) and neuron coordinates $(r, \theta)$. For example, look up tables are used to translate between the image coordinates of the input image and the neuron coordinates as used below.

In the outer plexiform module 302, relative proportions and spatial distributions of cone receptors were taken from a JWT dataset (see Literature Reference No. 15). The inset in FIG. 4, box l illustrates an example of a generated cone mosaic 400. Although S cones are vastly outnumbered by M and L cones (roughly blue, green, and red respectively), subsequent thalamocortical processing is able to amplify their effect in color perception (see Literature Reference No. 17). Color processing at the ganglion cell layer is demonstrated below in the section related to the inner plexiform module. Presently, cone sizes are of fixed pixel width. As can be appreciated by those skilled in the art, although the specific cone types are described, this procedure can be extended to any number of spectra. In another aspect, spectrally variant sampling is provided by randomly assigning receptors different spectra according to a given proportion of receptors across spectra.

Figure 4:
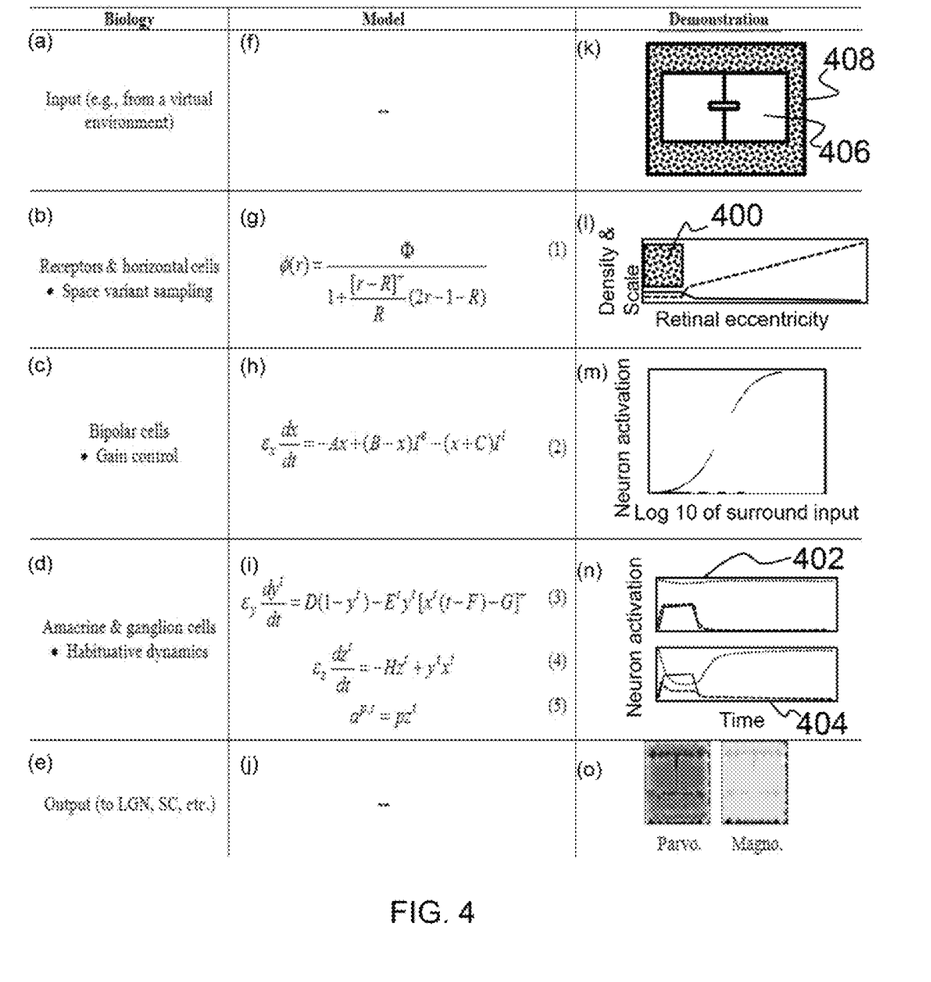
FIG. 4 is a table illustrating an example of biology, a retinal model, and the relevant demonstration according to the principles of the present invention.

Horizontal cells pool responses from several light receptors of different spectra (i.e., because horizontal cells sample from different types of cone cells). Spatially variant sampling is provided by the scaling function in equation 1 of FIG. 4, and as follows:

$$\phi(r) = \frac{\Phi}{1 + \frac{[r-R]^+}{R}(2r-1-R)}, \quad (1)$$

where $\phi(r)$ is the scaling function (its output is the scale of the cells at a given eccentricity), where $\phi$ refers to the base value of the function at the fovea, r refers to eccentricity, R refers to the size of the fovea, and $[\ ]^+$ is the Heaviside function. Spatial scale (dashed line) and density (solid line) are directly and inversely proportional to eccentricity (see Literature Reference No. 1) in that order, and as illustrated in FIG. 4, box l. Presently and in one aspect, the function for spatial scale is $^S0/(2\phi(r))$, where $^S0$ is the scale of cells in the fovea, while the function for density is $d_0\phi(r)$, where $d_0$ is the density of cells in the fovea, although alternate forms are also possible. $\phi(r)$ is inversely proportional to r. Thus at larger values of r, $\phi(r)$ is smaller. Spatial scale is inversely proportional to $\phi(r)$; thus at larger values of r, spatial scale is larger. Density is proportional to $\phi(r)$; thus at larger values of r, density is smaller. For a given value of r, one can then calculate the circumference and divide by the density to get the number of cells. Because $\phi(r)$ uses fewer cells at larger eccentricities (i.e., larger values of r), the image is compressed relative to a one-to-one map between pixels and cells. Furthermore, $\phi(r)$ is discretized into three constant values so that fewer convolutions at different scales need to be performed.

(4.2) Bipolar Cell Module

The bipolar cell module (element 304 of FIG. 3) provides gain control through a shunting equation to handle high dynamic ranges. For ON-center, OFF-surround bipolar cells, the excitatory center receptive field is smaller than its inhibitory surrounding annulus. The former is fed by one light receptor, while the latter is fed by horizontal cells. For OFF-center, ON-surround bipolar cells, relative receptive field influences are reversed (see Literature Reference No. 16). To model center-surround dynamics, a shunting or membrane equation (see Literature Reference No. 7) is used, as listed in equation 2 of FIG. 4. Specifically, center-surround dynamics to control high dynamic ranges of the image and provide gain control are given as follows:

$$\varepsilon_x \frac{dx}{dt} = -Ax + (B-x)I^e - (x+C)I^i, \quad (2)$$

where $\varepsilon_x$ is an integration constant, where x is the membrane voltage of a bipolar cell, $I^e$ represents excitatory inputs, $I^i$ represents inhibitory inputs, and A, B, and C are parameters. $I^e$ and $I^i$ are derived by convolving the input image with Gaussian kernels of different sizes. As noted above, for example, look up tables are used to quickly translate between image coordinates (row, column) and neuron coordinates (r, $\theta$).

For simplicity, retinal location (r, $\theta$) and scale ($s^{(r)}$) indices are not shown in the equation above. At equilibrium, this equation takes the form:

$$x = (BI^e - CI^i)/(A + I^e + I^i), \quad (6)$$

where I are derived by convolving the input image with Gaussian kernels of different sizes. The numerator in equation (6) is a difference of Gaussians, while the denominator provides a sum of Gaussians gain control term, as demonstrated in FIG. 4, box m. Each curve represents a constant surround input ($I^i$) to an ON-center bipolar cell from $10^{-2}$ to $10^3$ (5 decades in 100 steps) in arbitrary light intensity units. Within each curve, each point represents the cell equilibrium potential as the center input ($I^e$) was swept from $10^{-2}$ to $10^3$ (5 decades in 100 steps). With little center input (e.g., $10^{-2}$), the neuron's activation is low ($\approx 0$). As the amount of excitation increases, neuron response increases until it saturates ($\approx 1$) in a sigmoidal fashion. Because the shape of all curves is the same across background intensities, bipolar cells are able to use their full dynamic range, thus demonstrating gain control.

As noted above, look up tables are used to quickly translate between image coordinates (row, column) and neuron coordinates (r, $\theta$). It should also be noted that with respect to the compressed image as generated by the outer plexiform module, because there are fewer cells at larger eccentricities (i.e., larger values of r), the image is compressed relative to a one-to-one map between pixels and cells.

(4.3) Inner Plexiform Module

The inner plexiform module (element 306 of FIG. 3) performs habituative dynamics to produce outputs specialized for static or dynamic image content. Habituative dynamics at the ganglion cell layer use the depressing synapse model (see Literature Reference No. 6) of equations (3) and (4) as illustrated in FIG. 4, box i, and as reproduced below:

$$\varepsilon_y \frac{dy^t}{dt} = D(1-y^t) - E^t y^t [x^t(t-F) - G]^+, \text{ and} \quad (3)$$

$$\varepsilon_z \frac{dz^t}{dt} = -Hz^t + y^t x^t, \quad (4)$$

where $\varepsilon_y$ and $\varepsilon_z$ are integration constants, $y^t$ refers to neurotransmitter resources between a bipolar (center-surround dynamics) and ganglion cell (habituative dynamics) layer, superscript t refers to a type of ganglion cell, $x^t$ refers to activity of bipolar cells, and $z^t$ refers to continuous activity of the ganglion cell, and D, $E^t$, F, G, and H are parameters. For simplicity, retinal location (r, $\theta$) and scale ($s^{(r)}$) indices are not shown in the equations above.

As bipolar cells transmit their activity ($x^t$) to ganglion cells, they exhaust neurotransmitter resources ($y^t$) which can only recover when bipolar cells grow quiet. Most importantly, as $E^t$ increases, post-synaptic potentials become more transient. Sustained and transient response profiles which are best suited for static (e.g., colors) and dynamic (e.g., motion) processing respectively. In FIG. 4, box n, parvocellular dynamics 402 and magnocellular dynamics 404 are illustrated top to bottom. Here and as a non-limiting example, the input to both cells was clamped at 1 for the first 100 milliseconds, then set to 0. Both cells had the same shunting equation parameters but differed in the depressing synapses parameters. The top cell maintains a high level of activity, while the bottom cell habituates more quickly, with only a short blip of activity after the input is turned on. Here the bottom dashed line ($z^t$) represents the postsynaptic activity from the dynamical system, while the middle and top lines represent $x^t$ and $y^t$ respectively.

Further, equation (5) can be used to generate spiking dynamics. Equation (5) is illustrated in FIG. 4, box i, and is reproduced below:

$$a^{p,t} = pz^t \qquad (5)$$

$a^{p,t}$ denotes the continuous ganglion cell response including polarity and type, p denotes polarity, t denotes type (either rapidly habituating or not which refer to magno- and parvocellular respectively), and $z^t$ denotes the output from equation (4).

For ON polarity cells, p is +1 in equation (5) but −1 for OFF cells. This is equivalent to exchanging center and surround inputs in equation (2) (see Literature Reference No. 8) and hence does not require additional computation. Parvocellular cells have a smaller receptive field than magnocellular cells (see Literature Reference Nos. 10 and 3), so x is used directly for $x^t$. For magnocellular cells, a Gaussian kernel shapes x into $x^t$ and $E^t$ in equation (3) is also larger. This helps create more robust motion estimates. Spiking dynamics are created by using the continuous output of $a^{p,t}$ as a modulation factor on interspike intervals (ISIs). When $a^{p,t}$ is large, ISIs are smaller, creating a higher firing rate. Noise can be introduced by randomly perturbing ISIs. Spikes are often preferred to analog outputs because of power constraints (see, for example, Literature Reference No. 21).

Figure 5:
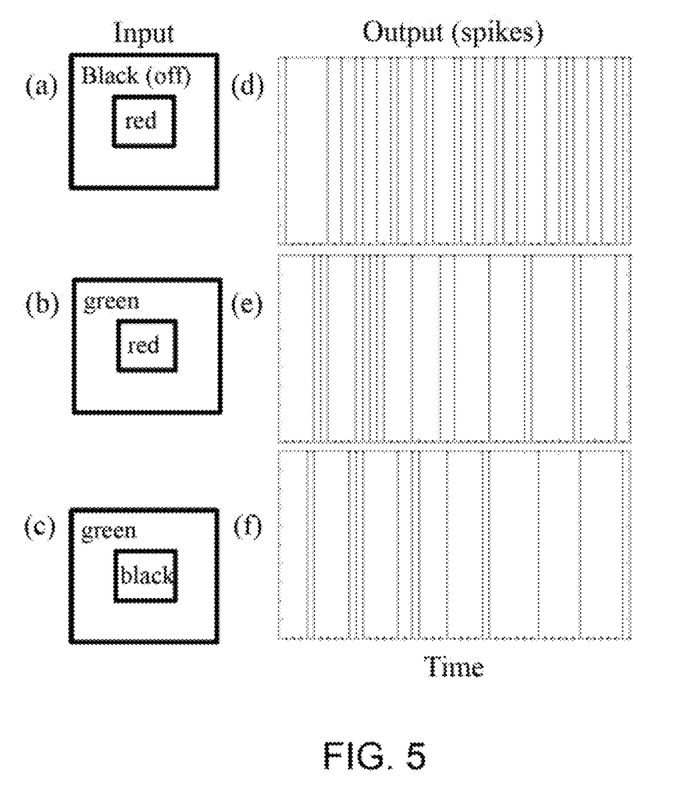
FIG. 5 is an image illustrating color processing at a ganglion cell level.

Parvocellular ganglion cells often exhibit color opponency (see Literature Reference No. 2), although thalamocortical color processing cells exhibit larger, more tuned receptive fields. A red ON-center, green OFF-surround ganglion cell, for example, would be maximally excited by a red spot, produce an intermediate response for a red spot in a green annulus, and be maximally inhibited by a green annulus. In equation (2), the first, second and third inputs would correspond to $I^e \approx 1, 1, 0$ and $I^i \approx 0, 1, 1$ in that order. FIG. 5 demonstrates this order of response magnitudes from the current model as well as its stochastic spike generation.

For example, color opponency in ganglion cells occurs when L cones (most sensitive to red) form the ON center of a receptive field while M cones (most sensitive to green) primarily form the OFF surround for example. Referring to FIG. 5, given a red spot (a), the cell responds maximally (d). A green annulus around a red spot (b) creates an intermediate response (e), and a green annulus (c) creates the minimum response (f). Noisy spikes are generated by randomly perturbing interspike intervals. For this simulation, input images were presented to the model for 50 milliseconds per frame with 10 frames per input. Spikes were recorded 150 milliseconds after each input presentation. These cone opponent cells form the basis of color vision by decoupling overlapping cone spectral sensitivities.

(5) Implementation, Benchmarking, and Experimental Results

To implement an example of the present invention, C++ code was written to interface with a neural simulation engine (see Literature Reference No. 12) with image convolution benefitting from Graphics Processing Unit (GPU) acceleration (see Literature Reference No. 13). An 845 frame sequence with 50 milliseconds per frame was extracted from the CASTLE virtual environment (see Literature Reference No. 14) with various resolutions. The first input frame shown in FIG. 4, box k, is a whiteboard 406 on a brown textured wall 408. Processing times and number of neurons used for the current model and Virtual Retina (see Literature Reference No. 18) were recorded with 3 runs per image resolution. For Virtual Retina, image sequences were first converted into grayscale and a default parameter file was used. GUI visualization was not used and file logging was held until the very end to maximize speed.

Example experimental results are depicted in FIG. 4. For example, box n depicts ON parvo- and magno-cellular results for a current model. In both outputs, detail drops off as a function of eccentricity which is indicative of the spatially variant sampling. Parvocellular results represent the static contrast of the dark lines on the whiteboard. Magnocellular results, however, appear nearly homogeneous due to the limited dynamic contrast in this frame. (As the virtual agent moves in the environment, the relative contrast between channels can be reversed.) Distinct color responses of individual neurons are not apparent at this stage of processing due to spectral mixing and spatial pooling.

Figure 6:
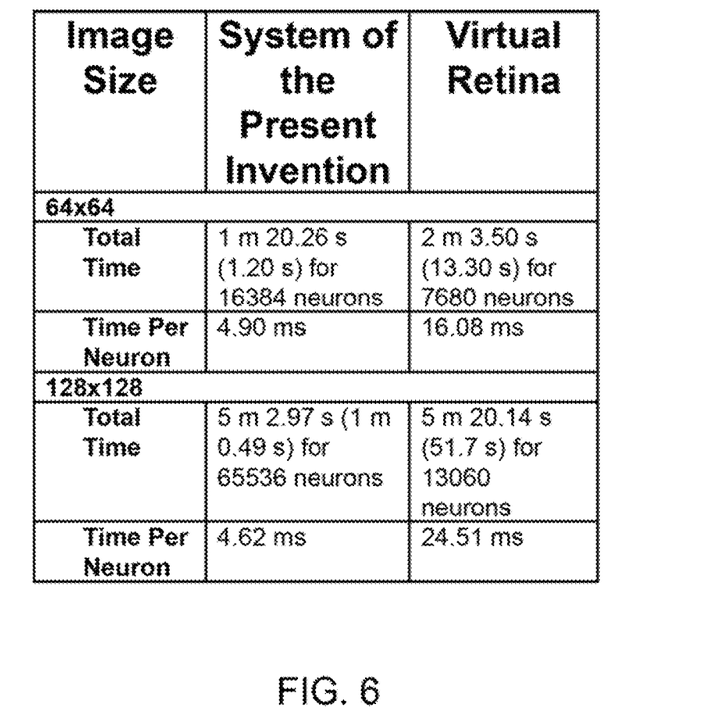
FIG. 6 is a table illustrating time results when comparing a Virtual Retina model (see Literature Reference No. 18) with a retinal model according to the principles of the present invention.

In comparison to Virtual Retina, the current model is faster both in aggregate (35.0% for 64×64 and 5.36% for 128×128 images) and on a per neuron basis (69.5% for 64×64 and 81.2% for 256×256). For example, FIG. 6 is a table illustrating timing results using the system according to the principles of the present invention as compared to Virtual Retina, in aggregate and on a per neuron basis for two image sizes. For both image sizes, the current model is faster. Median values are shown with range values are in parenthesis.

Although Virtual Retina could benefit from GPU acceleration, most processing time is likely spent on other computations. For example, with the current example model, convolution only accounts for approximately 6.3% of processing time per frame with image loading and differential equations taking 17.22% and 75.60% respectively. Furthermore, at present, Virtual Retina does not presently handle color images. While maintaining bio-plausibility, the current model demonstrates spatially variant sampling, gain control, habituative dynamics, and color processing (as illustrated in FIG. 4, boxes l through o, and FIG. 5). It also shows greater scaling, capabilities than Virtual Retina.

What is claimed is:

1. A computer program product for multispectral image processing with spiking dynamics, the computer program product comprising computer-readable instructions stored on a non-transitory computer-readable medium that are executable by a computer having one or more processors for causing the one or more processors to perform operations of:
   receiving an input image having image coordinates;
   translating the image coordinates into neuron coordinates;
   compressing, the image, using the neuron coordinates, through spatially and spectrally variant sampling;
   modeling center-surround dynamics, based on the neuron coordinates, to control high dynamic ranges of the image and provide gain control;
   modeling habituative dynamics, based on the neuron coordinates, to produce outputs specialized for static or dynamic image content; and
   generating neural spikes based on the habituative dynamics, the neural spikes being saved or provided to other systems for further image processing.

2. The computer program product as set forth in claim 1, further comprising an act of translating image coordinates (row, column) into neuron coordinates (r, θ) using a look up table.

3. The computer program product as set forth in claim 2, wherein spatially variant sampling is provided, using a scaling function, as follows:

$$\phi(r) = \frac{\Phi}{1 + \frac{[r-R]^+}{R}(2r-1-R)},$$

where $\phi(r)$ is the scaling function, where $\phi$ refers to a base value of the scaling function at a fovea, r refers to eccentricity, R refers to a size of the fovea, and $[\ ]^+$ is a Heaviside function, and where a function for spatial scale is $s_0/(2\phi(r))$, where $s_0$ is a scale of cells in the fovea, and where a function for density is $d_0\phi(r)$, where $d_0$ is the density of cells in the fovea.

4. The computer program product as set forth in claim 2, wherein spectrally variant sampling is provided by randomly assigning receptors different spectra according to a given proportion of receptors across spectra.

5. The computer program product as set forth in claim 2, wherein center-surround dynamics to control high dynamic ranges of the image and provide gain control are given as follows:

$$\varepsilon_x \frac{dx}{dt} = -Ax + (B-x)I^e - (x+C)I^i,$$

where $\varepsilon_x$ is an integration constant, where x is the membrane voltage of a bipolar cell, $I^e$ represents excitatory inputs, $I^i$ represents inhibitory inputs, and A, B, and C are parameters, and where $I^e$ and $I^i$ are derived by convolving the input image with Gaussian kernels of different sizes.

6. The computer program product as set forth in claim 2, wherein habituative dynamics to produce outputs specialized for static or dynamic image content are given as follows:

$$\varepsilon_y \frac{dy^t}{dt} = D(1-y^t) - E^t y^t [x^t(t-F) - G]^+,$$

and $$\varepsilon_z \frac{dz^t}{dt} = -Hz^t + y^t x^t,$$

where $\varepsilon_y$ and $\varepsilon_z$ are integration constants, $y^t$ refers to neurotransmitter resources between a bipolar and ganglion cell layer, superscript t refers to a type of ganglion cell, $x^t$ refers to activity of bipolar cells, and $z^t$ refers to continuous activity of the ganglion cell, and D, $E^t$, F, G, and H are parameters.

7. The computer program product as set forth in claim 2, wherein neural spikes are generated using the following equation as a modulation factor on interspike intervals (ISIs):

$$a^{p,t} = pz^t,$$

where p denotes polarity, t denotes type, $a^{p,t}$ denotes continuous ganglion cell response including polarity and type, and $z^t$ refers to the continuous activity of the ganglion cell.

8. A system for multispectral image processing with spiking dynamics, the system comprising:
one or more processors and a memory, the memory having executable instructions encoded thereon, such that upon execution of the instructions, the one or more processors perform operations of:
receiving an input image having image coordinates;
translating the image coordinates into neuron coordinates;
compressing the image, using the neuron coordinates, through spatially and spectrally variant sampling;
modeling center-surround dynamics, based on the neuron coordinates, to control high dynamic ranges of the image and provide gain control;
modeling habituative dynamics, based on the neuron coordinates, to produce outputs specialized for static or dynamic image content; and
generating neural spikes based on the habituative dynamics, the neural spikes being saved or provided to other systems for further image processing.

9. The system as set forth in claim 8, further comprising instructions encoded on the memory for causing the one or more processors to perform an operation of translating image coordinates (row, column) into neuron coordinates (r, $\theta$) using a look up table.

10. The system as set forth in claim 9, wherein spatially variant sampling is provided using a scaling function, as follows:

$$\phi(r) = \frac{\Phi}{1 + \frac{[r-R]^+}{R}(2r-1-R)},$$

where $\phi(r)$ is the scaling function, where $\phi$ refers to a base value of the scaling function at a fovea, r refers to eccentricity, R refers to a size of the fovea, and $[\ ]^+$ is a Heaviside function, and where a function for spatial scale is $s_0/(2\phi(r))$, where $s_0$ is a scale of cells in the fovea, and where a function for density is $d_0\phi(r)$, where $d_0$ is the density of cells in the fovea.

11. The system as set forth in claim 9, wherein spectrally variant sampling is provided by randomly assigning receptors different spectra according to a given proportion of receptors across spectra.

12. The system as set forth in claim 9, wherein center-surround dynamics to control high dynamic ranges of the image and provide gain control are given as follows:

$$\varepsilon_x \frac{dx}{dt} = -Ax + (B-x)I^e - (x+C)I^i,$$

where $\varepsilon_x$ is an integration constant, where x is the membrane voltage of a bipolar cell, $I^e$ represents excitatory inputs, $I^i$ represents inhibitory inputs, and A, B, and C are parameters, and where $I^e$ and $I^i$ are derived by convolving the input image with Gaussian kernels of different sizes.

13. The system as set forth in claim 9, wherein habituative dynamics to produce outputs specialized for static or dynamic image content are given as follows:

$$\varepsilon_y \frac{dy^t}{dt} = D(1-y^t) - E^t y^t [x^t(t-F) - G]^+,$$

and $$\varepsilon_z \frac{dz^t}{dt} = -Hz^t + y^t x^t,$$

where $\epsilon_y$ and $\epsilon_z$ are integration constants, $y^t$ refers to neurotransmitter resources between a bipolar and ganglion cell layer, superscript t refers to a type of ganglion cell, $x^t$ refers to activity of bipolar cells, and $z^t$ refers to continuous activity of the ganglion cell, and D, $E^t$, F, G, and H are parameters.

14. The system as set forth in claim 9, wherein neural spikes are generated using the following equation as a modulation factor on interspike intervals (ISIs):

$$a^{p,t} = pz^t,$$

where p denotes polarity, t denotes type, $a^{p,t}$ denotes continuous ganglion cell response including polarity and type, and $z^t$ refers to the continuous activity of the ganglion cell.

15. A computer implemented method for multispectral image processing with spiking dynamics, the method comprising an act of:
  causing one or more processors to execute instructions encoded on a memory, such that upon execution of the instructions, the one or more processors perform operations of:
    receiving an input image having image coordinates;
    translating the image coordinates into neuron coordinates;
    compressing the image, using the neuron coordinates, through spatially and spectrally variant sampling;
    modeling center-surround dynamics, based on the neuron coordinates, to control high dynamic ranges of the image and provide gain control;
    modeling habituative dynamics, based on the neuron coordinates, to produce outputs specialized for static or dynamic image content; and
    generating neural spikes based on the habituative dynamics, the neural spikes being saved or provided to other systems for further image processing.

16. The computer implemented method as set forth in claim 15, further comprising an act of executing instructions encoded on the memory for causing the one or more processors to perform an operation of translating image coordinates (row, column) into neuron coordinates (r, θ) using a look up table.

17. The computer implemented method as set forth in claim 16, wherein spatially variant sampling is provided using a scaling function, as follows:

$$\phi(r) = \frac{\Phi}{1 + \frac{[r-R]^+}{R}(2r-1-R)},$$

where $\phi(r)$ is the scaling function, where $\phi$ refers to a base value of the scaling function at a fovea, r refers to eccentricity, R refers to a size of the fovea, and $[\ ]^+$ is a Heaviside function, and where a function for spatial scale is $s_0/(2\phi(r))$, where $s_0$ is a scale of cells in the fovea, and where a function for density is $d_0\phi(r)$, where $d_0$ is the density of cells in the fovea.

18. The computer implemented method as set forth in claim 16, wherein spectrally variant sampling is provided by randomly assigning receptors different spectra according to a given proportion of receptors across spectra.

19. The computer implemented method as set forth in claim 16, wherein center-surround dynamics to control high dynamic ranges of the image and provide gain control are given as follows:

$$\varepsilon_x \frac{dx}{dt} = -Ax + (B-x)I^e - (x+C)I^i,$$

where $\epsilon_x$ is an integration constant, where x is the membrane voltage of a bipolar cell, $I^e$ represents excitatory inputs, $I^i$ represents inhibitory inputs, and A, B, and C are parameters, and where $I^e$ and $I^i$ are derived by convolving the input image with Gaussian kernels of different sizes.

20. The computer implemented method as set forth in claim 16, wherein habituative dynamics to produce outputs specialized for static or dynamic image content are given as follows:

$$\varepsilon_y \frac{dy^t}{dt} = D(1-y^t) - E^t y^t [x^t(t-F) - G]^+,$$

and $$\varepsilon_z \frac{dz^t}{dt} = -Hz^t + y^t x^t,$$

where $\epsilon_y$ and are $\epsilon_z$ are integration constants, $y^t$ refers to neurotransmitter resources between a bipolar and ganglion cell layer, superscript t refers to a type of ganglion cell, $x^t$ refers to activity of bipolar cells, and $z^t$ refers to continuous activity of the ganglion cell, and D, $E^t$, F, G, and H are parameters.

21. The computer implemented method as set forth in claim 16, wherein neural spikes are generated using the following equation as a modulation factor on interspike intervals (ISIs):

$$a^{p,t} = pz^t,$$

where p denotes polarity, t denotes type, $a^{p,t}$ denotes continuous ganglion cell response including polarity and type, and $z^t$ refers to the continuous activity of the ganglion cell.

* * * * *